United States Patent [19]
Smith et al.

[11] Patent Number: 5,901,547
[45] Date of Patent: May 11, 1999

[54] OPERATION METHOD FOR INTEGRATED GASIFICATION COMBINED CYCLE POWER GENERATION SYSTEM

[75] Inventors: Arthur Ramsden Smith, Telford; Donald Winston Woodward, New Tripoli, both of Pa.

[73] Assignee: Air Products and Chemicals, Inc., Allentown, Pa.

[21] Appl. No.: 08/974,260

[22] Filed: Nov. 19, 1997

Related U.S. Application Data

[62] Division of application No. 08/659,978, Jun. 3, 1996, abandoned.

[51] Int. Cl.$^6$ .................................................. F02C 3/28
[52] U.S. Cl. ................................ 60/39.02; 60/39.12
[58] Field of Search .......................... 60/39.02, 39.12, 60/39.182, 39.463, 39.465, 39.826

[56] References Cited

U.S. PATENT DOCUMENTS

| | | | |
|---|---|---|---|
| 3,731,495 | 5/1973 | Coveney | 62/39 |
| 4,019,314 | 4/1977 | Springman | 60/39.02 |
| 4,092,825 | 6/1978 | Egan | 60/39.02 |
| 4,224,045 | 9/1980 | Olszewski et al. | 62/30 |
| 4,557,735 | 12/1985 | Pike | 55/26 |
| 4,697,415 | 10/1987 | Schiffers | 60/30.12 |
| 5,081,845 | 1/1992 | Allam et al. | 62/24 |
| 5,146,741 | 9/1992 | Sood | 60/39.55 |
| 5,386,686 | 2/1995 | Chretien et al. | 60/39.02 |
| 5,406,786 | 4/1995 | Scharpf | 60/39.05 |
| 5,410,869 | 5/1995 | Muller | 60/39.02 |
| 5,501,078 | 3/1996 | Paolino | 60/39.12 |
| 5,636,510 | 6/1997 | Beer et al. | 60/39.23 |

FOREIGN PATENT DOCUMENTS 2067668  7/1981  United Kingdom .

OTHER PUBLICATIONS

Todd, D. M. "Clean Coal Technologies for Gas Turbines", presented at GE Turbine State–of–the–Art Technology Seminar, Jul. 1993, pp.1–18.
Anand, A.K., et al. "New Technology Trends for Improved IGCC System Performance", presented at International Gas Turbine and Aeroengine Congress and Exposition, Houston, Texas, Jun. 5–8, 1995.
Rao, A. D. et al. "Integration of Texaco TQ Gasification with Elevated Pressure ASU", presented at the 13th EPRI Conference on Gasification Power Plants, San Francisco, CA, Oct. 19–21, 1994.
Smith, A. R. et al. "Improved IGCC Power Output and Economics Incorporating a Supplementary Gas Turbine", presented at13th EPRI Conference on Gasification Power Plants, San Francisco, CA, Oct. 19–21, 1994.
Osterstock, E. R. et al, "Coproduction of Methanol Adds IGCC Flexibility", *Modern Power Systems*, Oct. 1997, pp. 19–23.

Primary Examiner—Louis J. Casaregola
Attorney, Agent, or Firm—John M. Fernbacher

[57] ABSTRACT

An integrated gasification combined cycle (IGCC) power generation system is operated at off-design conditions by introducing a supplemental fuel into the combustion turbine combustor to compensate for deviations from system design conditions. Such deviations include changes in ambient temperature and changes in the amount of extracted air required for the air separation system. The invention allows operation of the combustion turbine at or close to its maximum design power output and other components in the IGCC system at or close to their respective design points.

2 Claims, 1 Drawing Sheet

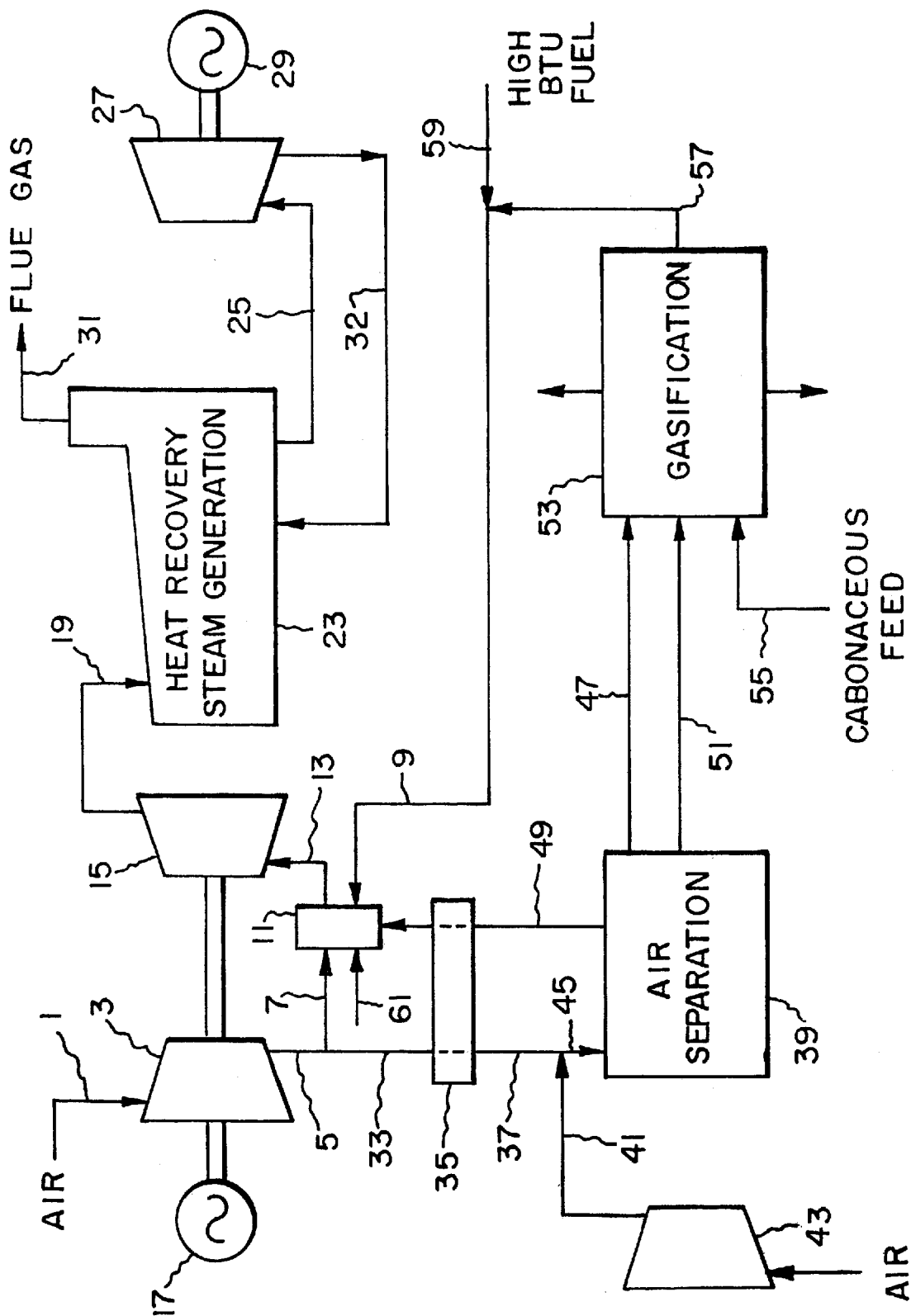

OPERATION METHOD FOR INTEGRATED GASIFICATION COMBINED CYCLE POWER GENERATION SYSTEM

This is a divisional of application Ser. No. 08/659,978 filed on Jun. 3, 1996 (abandoned).

TECHNICAL FIELD OF THE INVENTION

The invention pertains to the operation of integrated gasification combined cycle power generation systems, and in particular to improved methods for off-design operation of such systems.

BACKGROUND OF THE INVENTION

The generation of electricity by advanced gasification combined cycle power generation systems offers the potential for reduced power cost and lower environmental impact than standard coal-fired power plants. In these advanced systems, coal or other carbonaceous material is gasified with oxygen and the produced gas is cleaned to yield a low-sulfur fuel gas. This fuel gas is utilized in a combustion turbine generation system to produce electric power with reduced environmental emissions. The growing interest in gasification combined cycle (GCC) technology in recent years has been stimulated by the higher efficiency and demonstrated reliability of advanced combustion turbines, coal gasification processes, and air separation systems which are utilized in integrated gasification combined cycle (IGCC) systems. The proper integration of these three main components of an IGCC system is essential to achieve maximum operating efficiency and minimum power cost.

A general review of the current art in GCC and IGCC power generation systems is given by D. M. Todd in an article entitled "Clean Coal Technologies for Combustion turbines" presented at the GE Turbine State-of-the-Art Technology Seminar, July 1993, pp. 1–18. A. K. Anand et al present a review of the factors involved in the design of IGCC systems in a paper entitled "New Technology Trends for Improved IGCC System Performance" presented at the International Combustion turbine and Aeroengine Congress and Exposition, Houston, Tex., Jun. 5–8, 1995. A review of various integration techniques and the impact thereof on GCC economics is given in a paper by A. D. Rao et al entitled "Integration of Texaco TQ Gasification with Elevated Pressure ASU" presented at the $13^{th}$ EPRI Conference on Gasification Power Plants, San Francisco, Calif., Oct. 19–21, 1994.

In a paper entitled "Improved IGCC Power Output and Economics Incorporating a Supplementary Combustion Turbine" presented at the $13^{th}$ EPRI Conference on Gasification Power Plants, San Francisco, Calif., Oct. 19–21, 1994, A. R. Smith et al review several modes of integration between the combustion turbine and the air separation system in an IGCC process. In one mode, the air separation system feed air is provided by a separate compressor and a portion of the nitrogen product from the air separation system is compressed and introduced into the combustion turbine combustor. This nitrogen-integrated mode allows operation of the IGCC system at increased combustion turbine power output and reduced $NO_x$ formation. In an alternative operating mode, nitrogen integration is combined with air integration in which a portion of the feed air for the air separation system is supplied by extracted air from the combustion turbine compressor. This alternative mode, defined as air and nitrogen integration, gives greater operating flexibility and allows for a higher degree of optimization during IGCC system operation at part load and other off-design conditions.

Air- and nitrogen-integrated combustion turbine/air separation systems are described by representative U.S. Pat. Nos. 3,731,495, 4,019,314, 4,224,045, 4,557,735, 4,697,415, 5,081,845, 5,386,686, 5,406,786, and 5,410,869, and UK patent Application 2 067 668 A.

Combustion-based power generation systems, including IGCC systems, are subject to periods of operation below system design capacity due to changes in ambient air temperature and/or the cyclic demand for electric power. During these periods, such systems may operate below maximum design efficiency. The equipment selection and process design of an IGCC system therefore must address steady-state operation at design capacity as well as operation at off-design, part load, or turndown conditions. The air- and nitrogen-integrated IGCC system described above is a preferred option because of the potential for operating such a system at maximum overall efficiency, particularly when the system also must operate at off-design conditions.

The invention disclosed below and defined by the claims which follow addresses the need for improved methods to operate advanced power generation systems, and in particular describes the improved operation of air- and nitrogen-integrated combustion turbine and air separation systems at off-design conditions.

SUMMARY OF THE INVENTION

The invention is a method of operating an integrated gasification combined power generation system which comprises compressing air in a combustion turbine air compressor, combusting a fuel gas with at least a portion of the resulting compressed air in a combustion turbine combustor to form hot combustion products, and expanding the hot combustion products in a combustion turbine which drives the compressor and an electric generator. Air is separated into nitrogen-rich and oxygen-rich products in a cryogenic air separation system wherein feed air to the air separation system is provided by an additional portion of compressed air from the combustion turbine air compressor and optionally by additional air from a main air compressor. At least a portion of the nitrogen-rich product is introduced into the combustion turbine combustor, and the oxygen-rich product is utilized in a carbonaceous feed gasification process to generate synthesis gas comprising hydrogen and carbon oxides which provides at least a portion of the fuel gas for the combustion turbine combustor. When a combustion turbine operates at a power output which is less than its maximum design and desired power output, a supplemental fuel is introduced into the combustion turbine combustor and the amount of introduced supplemental fuel increases the combustion turbine power output to a selected value which is less than or equal to the maximum design power output.

The supplemental fuel preferably is a gas which is combined with the synthesis gas from the gasification process or is introduced directly into the combustion turbine combustor. The supplemental fuel can be natural gas, petroleum refinery fuel gas, or any other gas with a sufficient heating value. If desired, the supplemental fuel can be moisturized with water vapor to add diluent. Alternatively, the supplemental fuel is a liquid fuel which can be introduced directly into the combustion turbine combustor. The supplemental fuel provides up to 30% of the total heat generated in the combustion turbine combustor. Optionally, water is introduced into the combustion turbine combustor in combination with the supplemental fuel.

Alternatively, the invention can be described as a method of compensating for off-design operating conditions of an integrated gasification combined cycle power generation system which comprises introducing a supplemental fuel into the combustion turbine combustor, wherein the amount of introduced supplemental fuel is selected to increase the combustion turbine power output to a selected value which is less than or equal to the maximum design power output.

In an alternative embodiment, the invention is described as a method for the design and operation of an integrated gasification combined cycle power generation system at varying ambient air temperatures which comprises:

(a) designing the combustion turbine air compressor, the combustion turbine combustor, and the combustion turbine to provide a maximum design power output from the combustion turbine, wherein the maximum design power output utilizes a required amount of fuel, and designing the cryogenic air separation system and the carbonaceous feed gasification process to provide a selected portion of the required amount of fuel to operate the combustion turbine at the maximum design power output; and (b) operating the integrated gasification combined cycle power generation system and introducing a supplemental fuel into the combustion turbine combustor in order to operate the combustion turbine at a selected power output which is less than or equal to the maximum design power output.

BRIEF DESCRIPTION OF THE DRAWING

The single drawing illustrates an air-and nitrogen-integrated combined cycle power generation system utilizing the present invention.

DETAILED DESCRIPTION OF THE INVENTION

An air- and nitrogen-integrated IGCC process is illustrated in the Drawing wherein ambient air 1 is compressed in combustion turbine air compressor 3, which is typically an axial flow adiabatic compressor, to provide compressed air 5 at 150 to 450 psia and 600° F. to 900° F. A portion 7 of compressed air 5 is combusted with fuel 9 in combustion turbine combustor 11 to yield combustion product stream 13 typically at 2000° F. to 2800° F. Fuel 9 typically is a gaseous fuel chiefly comprising low BTU gas produced by the gasification of carbonaceous materials such as coal or heavy hydrocarbons. Combustion product stream 13 is expanded in combustion turbine 15 to generate shaft power which drives compressor 3 and electric generator 17. Turbine exhaust 19 at 0.2 to 2 psig and 900° F. to 1100° F. is cooled against boiler feedwater (not shown) in heat recovery zone 23 to generate steam 25 which is expanded in steam turbine 27 to drive additional electric generator 29. Generators 17 and 29 may be combined in a single unit. Flue gas 31 is discharged to the atmosphere after appropriate purification as required. Low pressure steam 32 from steam turbine 27 is condensed and reused in heat recovery zone 23.

Extracted air 33, which is the remaining portion of compressed air 5, optionally is cooled against nitrogen stream 49 (later defined) in heat exchange zone 35 to 300° F. to 900° F. and provides feed air 37 to air separation system 39. The remaining feed air 41 is provided by a main air compressor 43 to provide total feed air 45 to air separation system 39. The main air compressor is an intercooled centrifugal machine which provides feed air 41 at 40° F. to 120° F. and essentially the same pressure as cooled extracted air 37.

In usual design practice, the amount of extracted air 33 as a percentage of the total air separation system feed requirement is fixed for a given ambient air temperature. The term 50% extracted air, for example, means that extracted air 33 provides 50% of the total feed air to air separation system 39, and the remaining 50% is supplied by feed air 41 from the main air compressor. 100% extracted air means that all feed air for air separation system 39 is supplied from combustion turbine air compressor 3 and air 41 from the main air compressor is not required.

Total feed air 45 flows to cryogenic air separation system 39 wherein condensible impurities are removed from the air, and the air is cooled, condensed, and distilled to yield oxygen product 47, typically containing 80 to 99.9 vol % oxygen, and nitrogen products 49 and 51, typically containing 96 to 99.9 vol % nitrogen. Oxygen product 47 is provided at 200 to 1200 psia to provide oxygen to gasification system 53 which converts carbonaceous feedstock 55 into low BTU fuel gas 57 comprising chiefly hydrogen and carbon monoxide having a lower heating value (LHV) of 100–300 BTU/SCF. Low BTU fuel gas 57 alternatively is described as synthesis gas. The power to operate compressors associated with air separation system 39, which include the main air compressor (not shown) and the product compressors for oxygen 47, nitrogen 51, and nitrogen 49 typically but optionally is provided by a portion of the power from generators 17 and 29. This parasitic power required for air separation reduces the net power output of the IGCC system.

Cryogenic air separation processes for use in ICGG systems are well-known, and representative processes are described in U.S. Pat. Nos. 4,224,045, 5,081,845, and 5,224,336. Commercially-available gasification systems for this application have been developed by Texaco, Shell, BG-Lurgi, Prenflo, HTW, and Destec. Such feedstocks include coal, coke, vacuum residua, and other heavy hydrocarbons.

Nitrogen product 49 is compressed to 200 to 600 psia in air separation system 39, optionally heated against compressed air 33, and introduced into combustion turbine combustor 11. Nitrogen product 51 is compressed to 50 to 2000 psia in air separation system 39 to provide compressed nitrogen for purging, soot blowing, and coal conveying in gasification system 53.

The IGCC system of the Drawing typically is designed for an ambient temperature of 59° F., a fixed percentage of extracted air 33, an optimum inlet temperature for combustion turbine 15 which yields the maximum turbine power output, and a fully-loaded air compressor 3. Air separation system 39 and gasification system 53 are sized to provide sufficient fuel gas 57 and 9 to operate expansion turbine 15 at the desired inlet temperature and return a given flow of nitrogen 49 to combustor 11. When operating at steady state at these design conditions, the system produces the net design power output which equals the gross output from generators 17 and 29 less the power requirement for air separation system 39 and gasifier 53.

Under normal operation, the IGCC system rarely operates at design conditions and usually operates at off-design conditions. A common off-design condition is caused by diurnal and seasonal variations in ambient temperature and therefore variations in the temperature of air 1 at the suction of compressor 3. When the ambient air temperature increases, the density of suction air 1 to compressor 3 decreases, and at constant volumetric throughput of compressor 3 (operating with guide vanes wide open) the mass flow rate of compressed air 5 decreases. Less air is available for combustion air 7 and extracted air 33, and less low BTU fuel 9 is required in order to maintain the maximum inlet temperature of expansion turbine 15. Air separation system 39 operates below design since less oxygen 47 and nitrogen 49 are required, and the overall efficiency of the air separation system decreases. The mass flow of combustion gas 13 to combustion turbine 15 and exhaust 19 to heat recovery system 23 will decrease, which in turn decreases the net power output of generators 17 and 29. For a typical IGCC system, a 20° F. increase in ambient temperature will reduce the net power output by 8 to 10%.

When the ambient air temperature decreases, the density of suction air 1 to compressor 3 increases, and the mass flow rate of compressed air 5 increases at constant volumetric throughput of compressor 3. This increased air flow is in excess of that required to combust available low BTU fuel 9 and feed air separation system 39, because gasifier 53 and air separation system 39 are operating at maximum design capacity. The IGCC system therefore is operated in one of two possible modes: 1) all available air is utilized in combustor 11 and the inlet temperature to expansion turbine 15 decreases, reducing turbine efficiency and net power output; or (2) compressor 3 is operated below design capacity with the inlet guide vanes partially closed to supply only the flow of air required for combusting available low BTU fuel 9 to maintain the design maximum expansion turbine inlet temperature. Operation in this latter mode reduces the efficiency of compressor 3 and the net power generation of the IGCC system decreases.

Methods to improve the performance of IGCC systems at off-design conditions are known in the art. In one of these methods, when ambient air temperature is above design, inlet air 1 to compressor 3 is cooled to increase air density and increase mass flow to combustor 11. This cooling is accomplished by indirect heat exchange against chilled water, by direct heat exchange with ice, or by direct evaporative cooling with vaporization of water into the inlet air 1. Another method injects water into combustor 11 or the inlet of combustion turbine 15 to increase mass flow during periods of high ambient temperature; this is possible as long as sufficient heating value is available in low BTU fuel gas 9.

Operation of IGCC systems at off-design conditions can result in the inefficient performance of individual system components at ambient temperatures above or below design. This in turn results in lower net power output at certain ambient conditions for a given system design. Alternatively, individual system components can be overdesigned to meet net power requirements at certain ambient conditions, but such overdesigned system components will operate inefficiently at below-design conditions at other ambient temperatures.

It is desirable to design an IGCC system such that each component operates as closely as possible to its design operating point, since excursions from the design point lead to inefficient operation. Because ambient temperatures change diurnally as well as seasonally, such a design is difficult. As discussed above, it is well known in the art that when ambient temperatures are above design there can be insufficient air to combust the available low BTU fuel and provide sufficient mass flow to the combustion turbine. Conversely, when ambient temperatures are below design there can be excess air available to combust the available low BTU fuel from a gasifier operating at full capacity and maintain the inlet temperature to the combustion turbine at the maximum design value. Operating compromises therefore are necessary to minimize the effects of changing ambient temperatures on power output and IGCC system operating efficiency.

The present invention addresses these problems by introducing a controlled amount of supplemental fuel 59 into low BTU fuel gas 57 from gasifier 53 to provide blended fuel gas 9 to combustion turbine combustor 11. Supplemental fuel 59 can be any gaseous fuel such as natural gas or a refinery or petrochemical plant offgas which has more value as a fuel than a chemical feedstock. For certain operating conditions, supplemental fuel 59 can be an appropriate liquid fuel which can be introduced directly into combustor 11. As described below, the amount of supplemental fuel 59 is carefully controlled to minimize inefficiencies in the IGCC system operation at off-design conditions. Typically the supplemental fuel provides up to 30% of the total heat generated in combustion turbine combustor 11. Optionally, water 61 can be introduced into combustor 11 or into the inlet of combustion turbine 15 in combination with supplemental fuel 59 to increase the overall operating flexibility of the IGCC system.

One embodiment of the invention is directed towards the improved operation of an existing IGCC system in which combustion turbine air compressor 3 is operating below design capacity, which for example occurs when the ambient temperature is below the design ambient temperature. As earlier described, at low ambient temperature more air is available from compressor 3 than is required to combust available low BTU fuel 57 to maintain the design inlet temperature of expansion turbine 15. Under these conditions, either (1) compressor 3 is operated at design volumetric flow and combustion turbine 15 is operated at an inlet temperature below design, which reduces turbine efficiency, or (2) compressor 3 is operated below design volumetric flow (for example by closing inlet guide vanes) to maintain the design inlet temperature of expansion turbine 15, which reduces the operating efficiency of compressor 3.

Under the conditions described above, a controlled flow of supplemental fuel 59 with a higher heating value is combined with low BTU fuel gas 57 to increase the net heating value of fuel 9. This allows the increased flow of combustion air 7 by operating compressor 3 at closer to design volumetric capacity, which in turn allows operation of combustion turbine 15 at its maximum inlet temperature, increases the pressure at the inlet of the expander, and increases the total heating rate to combustor 11 and expansion turbine 15. This increases the overall power output of expansion turbine 15 to a value less than or equal to its maximum power output, and also increases the output of steam turbine 27, thereby compensating for the effect of reduced ambient temperature on IGCC operation.

In an alternative embodiment of the invention, the use of supplemental fuel 59 is included as an operating feature of a new IGCC system designed for a specified power output regardless of ambient temperature. In this embodiment, the key design parameters of the combustion turbine section of the IGCC system are fixed, namely, the total design power output of generators 17 and 29, combustor 11 firing temperature and resulting combustion turbine 15 inlet temperature, the maximum power output of combustion turbine 15, the maximum mass flow from compressor 3, and the ambient temperature. The flow of extracted air 33 and the sizes of air separation system 39 and gasifier 53 are selected and optimized. Generally the sizes of air separation system 39 and gasifier 53 are selected so that a predetermined minimum amount of low BTU fuel gas 57 is generated at all times regardless of ambient temperature, and the remaining amount of fuel is provided by supplemental fuel 59. This minimum amount of low BTU fuel gas 57 generally is required at the highest expected ambient temperatures. The rate of heat addition of supplemental fuel 59 will be highest at the lowest expected ambient temperatures. The rate of heat addition of supplemental fuel 59 thus varies from minimum to maximum as the ambient temperature varies from maximum to minimum.

The benefit of this embodiment of the invention is that air separation system 39 and gasifier 53 are sized to provide the minimum required flow of low BTU fuel gas 57, and therefore are smaller than if designed to provide the required amount of low BTU fuel gas 57 at the design ambient temperature. The invention thus reduces the capital cost of air separation system 39 and gasifier 53. In addition, the invention reduces or eliminates the operation of air separation system 39 and gasifier 53 at conditions below design capacity, and thus enables efficient operation at or near steady state.

Other changes in IGCC operating conditions may affect the relative performance of compressor 3 and combustion turbine expander 15. For example, compressor 3 may operate below its design capacity if the required amount of extracted air 33 decreases due to changed operating requirements of air separation system 39 and/or gasifier 53. The efficiency of compressor 3 therefore decreases. Alternatively, the optimization of extracted air 33 and the return of nitrogen product 49 to combustor 11 may result in the operation of compressor 3 and/or combustion turbine 15 below the respective design points. In such situations, the addition of a selected amount of supplemental fuel 59 can optimize the overall IGCC system operation. By controlled addition of supplemental fuel 59, the combustion turbine can be adjusted to achieve maximum capacity and efficiency while maintaining the design firing temperature and operating air separation system 39 and gasifier 53 at design capacity.

Thus the addition of supplemental fuel 59 has benefit in operating situations which cause air compressor 3 to operate below its design capacity and/or combustion turbine expander 15 to operate below its design maximum inlet temperature and maximum design power output. Depending on the design of the IGCC system, these operating situations also may require the operation of air separation system 39 and gasifier 53 to operate below their design capacities, which reduces operating efficiency. Air compressor 3 may operate below its design capacity for various reasons including high ambient temperatures and reduced requirements for extracted air 33. As discussed above, a preferred embodiment of the present invention is to operate air separation system 39 and gasifier 53 to operate as close as possible to design capacities, and to compensate for decreased compressor volumetric flow (in which the guide vanes are partially closed) to combustion turbine 15 by adding supplemental fuel 59 with a higher heating value than fuel gas 57. Alternatively, in order to compensate for lower compressor mass flow (in which the guide vanes are wide open), supplemental fuel 59 with a heating value lower than fuel gas 57 is utilized which adds additional mass flow to combustion turbine 15.

EXAMPLE 1

The IGCC system of the Drawing is designed and operated according to the following specifications: air 33 provides 20% of air 45 to air separation system 39 (i.e. 20% air extraction); the maximum output of combustion turbine 15 is 185 MW; and the net power output is 257 MW at the design maximum inlet temperature of 2325° F. to combustion turbine 15 and the design ambient temperature of 59° F. (60% relative humidity). Combustion turbine 15 operates at a fixed inlet volume. In this Example, the ambient air temperature drops to 20° F., and compressor 3 is operated at a discharge capacity of 3288 klb/hr with the maximum amount of low BTU fuel gas 57 which yields a reduced inlet temperature of 2228° F. to combustion turbine 15. These conditions result from operating the IGCC system at a fixed inlet volume to expander 15, 185 MW output from expander 15, and the maximum amount of low BTU gas 57 from gasifier 53. The net IGCC power is 254 MW at these operating conditions. Methane is introduced as supplemental fuel 59 such that fuel 9 to combustor 11 contains 1 vol % methane, and the methane supplies 6.2% of the total lower heating value of fuel 9. Air flow from compressor 3 is increased to 3558 klb/hr, which reduces the inlet temperature to expander 15 to 2161° F. Unexpectedly, the net IGCC power increases to 262 MW while maintaining the combustion turbine output at 185 MW. This increase is due to a combination of higher air flow, higher pressure to combustion turbine 15, and an increase in total heating rate to combustor 11. In addition, the flow of expander exhaust 15 is increased which generates more power from generator 29. These factors more than compensate for the reduction in expander 15 inlet temperature.

EXAMPLE 2

The IGCC system of the Drawing is operated according to the following specifications: air 33 provides 100% of air 45 to air separation system 39 (i.e. 100% air extraction) and air 41 is not used; the maximum design output of combustion turbine 15 is 185 MW (the same design as in Example 1); the design maximum inlet temperature to combustion turbine 15 is 2325° F.; and the design ambient temperature is 59° F. (60% relative humidity). Compressor 3 delivers a maximum air flow of 3375 klb/hr, and gasifier 53 produces the maximum volume of low BTU gas 57.

In this Example, the IGCC system operates at a combustion turbine 15 output of 151 MW, which is only 81.6% of design. The net IGCC power is 241 KW. According to the present invention, methane as supplemental fuel 59 is blended with the maximum available low BTU gas 57 such that total fuel gas 9 is 5 vol % methane. Air to combustor 11 remains at the maximum rate of 3375 klb/hr. In addition, 201 klb/hr of water is added to combustor 11 to increase mass flow to turbine expander 15. As a result, the output of combustion turbine 15 is increased to the design value of 185 MW and the net IGCC system power is increased to 289 MW.

Supplemental fuel 59 can have a heating value higher or lower than the heating value of fuel gas 57 as discussed above. Generally a supplemental fuel with a higher heating value than fuel gas 57 is preferred if the ambient temperature is lower than design or if the flow of extracted air 33 is lower than design. A supplemental fuel with a lower heating value than fuel gas 57 is preferred if the ambient temperature is higher than design.

Thus the present invention offers a method for operating IGCC systems at off-design conditions by adding a controlled amount of supplemental fuel 59 to combustor 11 to compensate for deviations from system design conditions. Such deviations include changes in ambient temperature and changes in the amount of extracted air 33 for air separation system 39. The general objective of the invention is to control the addition of supplemental fuel 59 in order to operate combustion turbine 15 as close as possible to its maximum design power output with (1) operation of combustion turbine air compressor 3 at its maximum design volumetric air rate and/or (2) optimized flow to combustor 11 of air from compressor 3 and return nitrogen 49 from air separation system 39 while maintaining the optimum firing temperature. Air separation system 39 and gasification system 53 are designed to provide less than the maximum fuel heating rate required for combustor 11, and the remainder is provided by supplemental fuel 59. This allows air separation system 39 and gasification system 53 to be fully utilized by operating at design capacity for a majority of the operating period.

The essential characteristics of the present invention are described completely in the foregoing disclosure. One skilled in the art can understand the invention and make various modifications without departing from the basic spirit of the invention, and without deviating from the scope and equivalents of the claims which follow.

We claim:

1. A method of operating an integrated gasification combined cycle power generation system which comprises compressing air in a combustion turbine air compressor, combusting a fuel gas with at least a portion of the resulting compressed air in a combustion turbine combustor to form hot combustion products, expanding the hot combustion products in a combustion turbine which drives the compressor and an electric generator, wherein the combustion turbine operates at power output which is less than its maximum design power output, separating air into nitrogen-rich and oxygen-rich products in a cryogenic air separation system wherein feed air to the air separation system is provided by an additional portion of compressed air from the combustion turbine air compressor, introducing at least a portion of the nitrogen-rich product into the combustion turbine combustor, utilizing the oxygen-rich product in a carbonaceous feed gasification process to generate synthesis gas comprising hydrogen and carbon oxides which provides at least a portion of the fuel gas for the combustion turbine combustor, and introducing a liquid supplemental fuel into the combustion turbine combustor when the integrated gasification combined cycle power generation system operates at off-design conditions, wherein the supplemental fuel increases the combustion turbine power output to a selected value which is less than or equal to the maximum design power output.

2. The method of claim 1 wherein the additional portion of compressed air from the combustion turbine air compressor is combined with additional air from a main air compressor.

* * * * *